US012711528B2

(12) United States Patent
Meyyappan et al.

(10) Patent No.: US 12,711,528 B2
(45) **Date of Patent: *Aug. 18, 2026**

(54) SYSTEMS AND METHODS FOR ON DEMAND AND LOCATION-BASED MESSAGING

(71) Applicant: Wells Fargo Bank, N.A., San Francisco, CA (US)

(72) Inventors: Uma Meyyappan, Fremont, CA (US); Bipin Sahni, Pleasanton, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/808,498

(22) Filed: Aug. 19, 2024

(65) Prior Publication Data

US 2025/0054035 A1 Feb. 13, 2025

Related U.S. Application Data

(60) Continuation of application No. 17/962,386, filed on Oct. 7, 2022, now Pat. No. 12,067,604, which is a (Continued)

(51) Int. Cl.
*G06Q 30/00* (2023.01)
*G06Q 10/40* (2026.01)
(Continued)

(52) U.S. Cl.
CPC ......... *G06Q 30/0611* (2013.01); *G06Q 10/40* (2026.01); *H04L 51/52* (2022.05); *H04L 67/52* (2022.05); *H04L 67/535* (2022.05)

(58) Field of Classification Search
CPC .... G06Q 30/0611; G06Q 50/01; H04L 67/52; H04L 51/52; H04L 67/535
(Continued)

(56) References Cited

U.S. PATENT DOCUMENTS

| | | | |
|---|---|---|---|
| 6,721,776 | B1 | 4/2004 | Erickson et al. |
| 7,725,875 | B2 | 5/2010 | Waldrep |

(Continued)

FOREIGN PATENT DOCUMENTS

| | | | |
|---|---|---|---|
| WO | WO-2010/085370 | A2 | 7/2010 |
| WO | WO-2017/181185 | A1 | 10/2017 |

OTHER PUBLICATIONS

Grossmann, John. "Connecting With Clients Through the Power of Tech: Business/Financial Desk", New York Times, Late Edition (East Coast). New York, NY. Jun. 16, 2011, 3 pages.

*Primary Examiner* — Robert M Pond
(74) *Attorney, Agent, or Firm* — Foley & Lardner LLP

(57) ABSTRACT

A social media computing system is described. The social media computing system provides a social media platform to a plurality of users. Additionally, the social media computing system provides merchants the ability to provide targeted offers to users of the social media platform. As used herein, the word "merchants" also includes service providers. The offers relate to goods or services provided by the merchants. In some situations, the offers are transmitted by the social media computing system to user devices based on requests by the users. In other situations, the offers can be transmitted directly from the merchants to the user devices based on determined locations of the user devices.

20 Claims, 18 Drawing Sheets

Related U.S. Application Data continuation of application No. 16/193,197, filed on Nov. 16, 2018, now Pat. No. 11,468,485, which is a division of application No. 14/990,099, filed on Jan. 7, 2016, now abandoned.

(60) Provisional application No. 62/101,790, filed on Jan. 9, 2015.

(51) Int. Cl.

| | |
|---|---|
| ***G06Q 30/0601*** | (2023.01) |
| ***H04L 51/52*** | (2022.01) |
| ***H04L 67/50*** | (2022.01) |
| ***H04L 67/52*** | (2022.01) |

(58) Field of Classification Search
USPC ........................................................ 705/26, 27
See application file for complete search history.

(56) References Cited

U.S. PATENT DOCUMENTS

| | | | |
|---|---|---|---|
| 8,812,024 | B2 | 8/2014 | Obermeyer et al. |
| 9,058,604 | B2 | 6/2015 | Carr et al. |
| 9,204,257 | B1 | 12/2015 | Mendelson |
| 9,542,673 | B2 | 1/2017 | Tanner et al. |
| 9,589,268 | B2 | 3/2017 | Hammad |
| 9,830,606 | B2 | 11/2017 | Boncimino |
| 10,127,528 | B2 | 11/2018 | Solis |
| 10,187,343 | B2 | 1/2019 | Maginnis et al. |
| 10,354,240 | B2 | 7/2019 | Purves et al. |
| 10,362,010 | B2 | 7/2019 | Sharp et al. |
| 10,410,272 | B1 | 9/2019 | Johnson et al. |
| 10,467,689 | B2 | 11/2019 | Chen |
| 10,540,692 | B2 | 1/2020 | Hu et al. |
| 11,468,485 | B1 | 10/2022 | Meyyappan et al. |
| 2001/0014868 | A1 | 8/2001 | Herz et al. |
| 2003/0004743 | A1 | 1/2003 | Callegari |
| 2006/0095327 | A1 | 5/2006 | Vaughn et al. |
| 2010/0144368 | A1 | 6/2010 | Sullivan et al. |
| 2011/0238474 | A1 | 9/2011 | Carr et al. |
| 2011/0238476 | A1 | 9/2011 | Carr et al. |
| 2012/0066064 | A1 | 3/2012 | Yoder et al. |
| 2012/0203700 | A1 | 8/2012 | Ornce et al. |
| 2012/0317194 | A1 | 12/2012 | Tian |
| 2013/0013512 | A1 | 1/2013 | Cloud et al. |
| 2013/0041734 | A1 | 2/2013 | Dean et al. |
| 2013/0091002 | A1 | 4/2013 | Christie et al. |
| 2013/0332253 | A1 | 12/2013 | Shiffert et al. |
| 2013/0346302 | A1 | 12/2013 | Purves et al. |
| 2014/0279238 | A1 | 9/2014 | Jones et al. |
| 2014/0351093 | A1 | 11/2014 | Jeremias |
| 2014/0365304 | A1 | 12/2014 | Showers et al. |
| 2015/0019423 | A1 | 1/2015 | Dowling et al. |
| 2015/0080032 | A1 | 3/2015 | Moldavsky et al. |
| 2015/0100433 | A1 | 4/2015 | Choy et al. |
| 2015/0127493 | A1 | 5/2015 | Winkelman et al. |
| 2015/0154588 | A1 | 6/2015 | Purves et al. |
| 2015/0310497 | A1 | 10/2015 | Valin et al. |
| 2015/0339644 | A1 | 11/2015 | Stults et al. |
| 2015/0341331 | A1 | 11/2015 | Weksler et al. |
| 2015/0371173 | A1 | 12/2015 | Jalali |
| 2015/0371226 | A1 | 12/2015 | Hurley et al. |
| 2016/0086244 | A1 | 3/2016 | Dinardo et al. |
| 2018/0068312 | A1 | 3/2018 | Kim et al. |
| 2018/0253727 | A1 | 9/2018 | Ortiz et al. |
| 2018/0315024 | A1 | 11/2018 | Rauch et al. |
| 2019/0005467 | A1 | 1/2019 | Varagani et al. |
| 2019/0087894 | A1 | 3/2019 | Bloy et al. |
| 2019/0205851 | A1 | 7/2019 | Sinha et al. |
| 2019/0244263 | A1 | 8/2019 | Nelson et al. |
| 2019/0303910 | A1 | 10/2019 | Asbe et al. |

400

FIG. 6
1:06 PM
Snapoffers
TODAY
ME
#headphones
SNAPOFFERS
W
MERCH has this great pair for ~~$24.99~~ $9.99
just for you for the next 15 minutes.
Want it? Reply yes or no.
ME
yes
Send a chat

600

FIG. 7
1:06 PM
Snapoffers
TODAY
ME
#headphones
SNAPOFFERS
W
MERCH has this great pair for ~~$24.99~~ $9.99
just for you for the next 15 minutes.
Want it? Reply yes or no.
ME
yes
SNAPOFFERS
Send me $9.99 and they're yours!
*Send a chat*

700

900

FIG. 10
1:06 PM
Snapoffers
TODAY
ME
#headphones
SNAPOFFERS
W
MERCH has this great pair for ~~$24.99~~ $9.99
just for you for the next 15 minutes.
Want it? Reply yes or no.
ME
yes
SNAPOFFERS
Send me $9.99 and they're yours!
ME
You sent $9.99
SNAPOFFERS
Awesome! Use code ABC123 at any
register or order online.
Send a chat

1000

Figure 12:
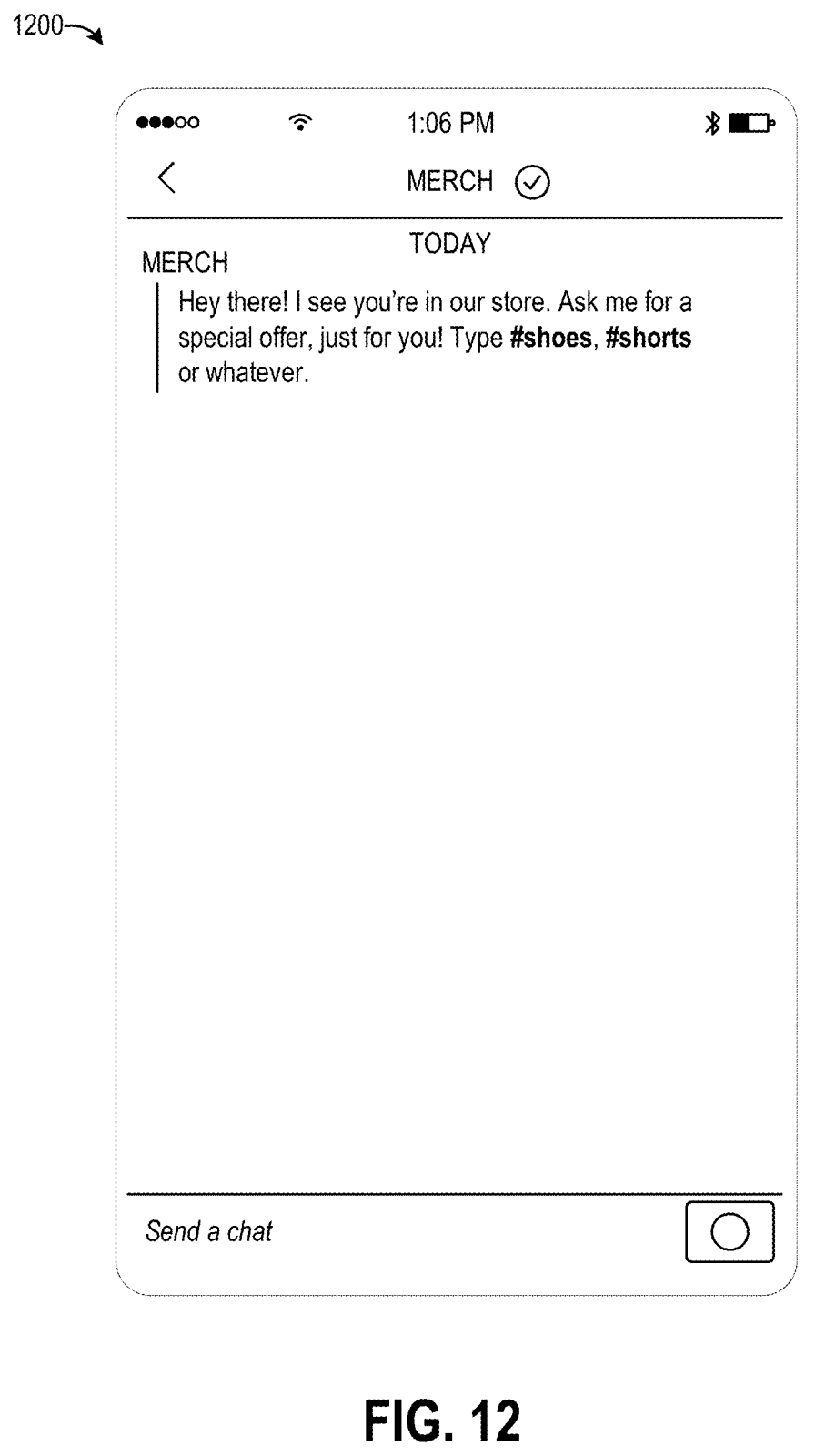

1200

1:06 PM

MERCH

TODAY

MERCH

Hey there! I see you're in our store. Ask me for a special offer, just for you! Type #shoes, #shorts or whatever.

*Send a chat*

Figure 13:
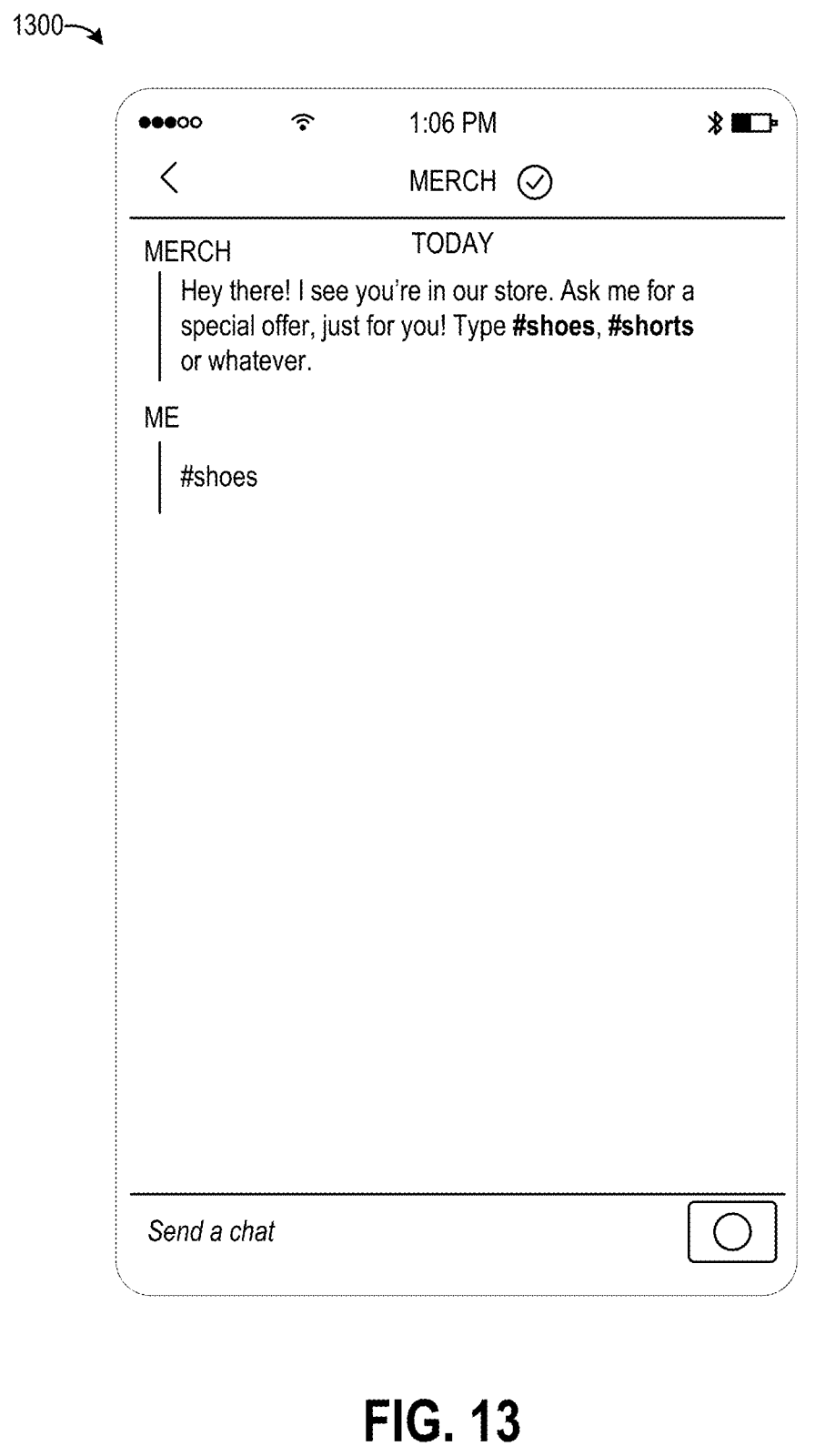

MERCH

MERCH TODAY

Hey there! I see you're in our store. Ask me for a special offer, just for you! Type #shoes, #shorts or whatever.

ME

#shoes

*Send a chat*

SYSTEMS AND METHODS FOR ON DEMAND AND LOCATION-BASED MESSAGING

CROSS-REFERENCE TO RELATED APPLICATIONS

This application is a continuation of U.S. patent application Ser. No. 17/962,386 filed Oct. 7, 2022, which is a continuation of U.S. patent application Ser. No. 16/193,197 filed Nov. 16, 2018, which is a divisional application of U.S. patent application Ser. No. 14/990,099 filed Jan. 7, 2016, which claims priority to U.S. Provisional Patent Application No. 62/101,790 filed Jan. 9, 2015, each of which is incorporated herein by reference in its entirety.

BACKGROUND

Social media platforms are becoming more and more popular. Users of various social media platforms utilize the platforms to message other users, to share pictures, to read the news, to play games, to access media (e.g., photos, videos, music, etc.), and the like. As the popularity of social media platforms continues to grow, the use cases for the social media platforms continue to increase. The social media platform also present new opportunities for merchants to reach a large customer base.

SUMMARY

One embodiment relates to a method of providing on demand offers to a user via a social media platform. The social media platform hosted by a social media computing system having a processor. The method includes receiving, by the processor, an offer request from a user via a user device. The user is a registered user of the social media platform. The offer request includes an identification of a product or service. The method further including querying, by the processor, an offer database of the social media computing system for a first matching offer. The method including transmitting, by the processor, the first matching offer to the user device. The method including receiving, by the processor, an indication that the user accepted the offer.

Another embodiment relates to a method of temporarily permitting a merchant to send offers to a user of a social media platform based on a location of the user. The method including receiving, by a processor of a social media computing system, user location information from a user device. The user is a user of the social media platform. The method further including determining, by the processor, that the user is in proximity to a merchant. The method including enabling, by the processor, a merchant computing system associated with the merchant the ability to send messages to the user via the social media platform. The method including transmitting, by the processor, a message containing an offer from the merchant to the user, the offer relating to a product or service of the merchant.

A further embodiment relates to a merchant offers system. The system includes a locator beacon network. The system further includes a network interface configured to communicate with a user device associated with a user and a merchant computing system associated with a merchant. The system includes memory and a processor. The processor is configured to receive user location information from the user device. The user is a user of a social media platform. The user location information is based on a determined position of the user device as identified through the locator beacon network. The processor is further configured to determine that the user is in proximity to the merchant. The processor is configured to enable the merchant computing system to send messages to the user via the social media platform. The processor is further configured to transmit a message containing an offer from the merchant computing system to the user device, the offer relating to a product or service of the merchant.

Another embodiment relates to a social media system associated with a social media platform. The system includes a network interface, memory, and a processor. The processor is configured to receive an offer request from a user via a user device. The user is a registered user of the social media platform. The offer request includes an identification of a product or service. The processor is further configured to query an offer database of the social media computing system for a first matching offer. The processor is configured to transmit the first matching offer to the user device. The processor is further configured to receive an indication that the user accepted the offer.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIGS. 12 through 18 show example user interfaces of a social media client during the method of FIG. 11.

DETAILED DESCRIPTION

Referring generally to the figures, a social media computing system is described. The social media computing system provides a social media platform to a plurality of users. Additionally, the social media computing system provides merchants the ability to provide targeted offers to users of the social media platform. As used herein, the word “merchants” also includes service providers. The offers relate to goods or services provided by the merchants. In some situations, the offers are transmitted by the social media computing system to user devices based on requests by the users. In other situations, the offers can be transmitted directly from the merchants to the user devices based on determined locations of the user devices.

Figure 1:
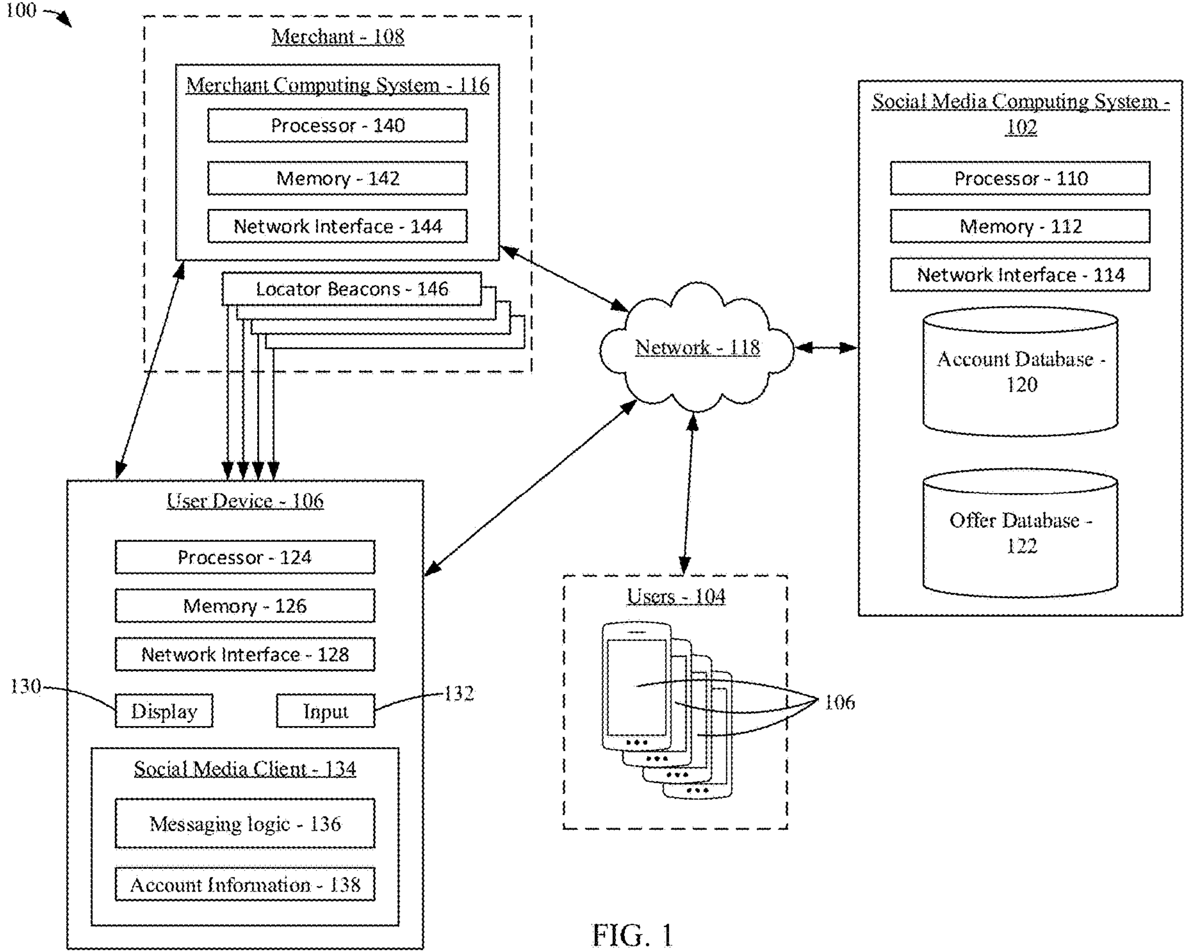
FIG. 1 is a diagram of a computing system according to an exemplary embodiment.

Referring to FIG. 1, a diagram of a computing system 100 is shown according to an example embodiment. The computing system 100 includes a social media computing system 102. The social media computing system 102 provides a plurality of users 104 a social media platform. The users 104 access the social media platform via user devices 106. The user devices may include mobile devices, such as smartphones, tablet computers, PDAs, and the like. As described in further detail below, the social media computing system 102 also allows merchants 108 to send offers relating to goods and services provided by the merchants to the users 104. The offers may be selected and sent directly by the merchant 108 to the users 104 via the social media platform. Alternatively, the offers may be selected by the social media computing system 102 and sent to the users 104 via the social networking platform.

The social media computing system 102 includes a processor 110 and memory 112. In some arrangements, the social media computing system 102 includes a plurality of processors. The memory 112 stores programming modules that, when executed by the processor 110, control the operation of the social media computing system 102. The programming modules include social media logic that allows the social media computing system 102 to provide the social media platform to the plurality of users 104. The social media platform, for example, allows the users 104 to send and receive messages with contacts. For example, a first user of the social media platform that is a registered contact with a second user of the social media platform can send messages to the second user. The messages may include text, pictures, videos, audio, hyperlinks, and other content. In some arrangements, the social media platform prohibits non-contact users from sending messages between each other. The programming modules include offer logic. As described in further detail below, the offer logic allows the social media computing system 102 to store and distribute offers from merchants 108 to the users 104. In further arrangements, the programming modules include payment logic. The payment logic allows the users 104 to send payments (e.g., via credit card, via bank account, via mobile wallet, etc.) to other users and to the merchants 108.

The social media computing system 102 includes a network interface 114 that allows the social media computing system 102 to communicate data to and from other devices (e.g., user devices 106, the merchant computing system 116, etc.) via the network 118.

The social media computing system 102 includes an account database 120 and an offer database 122. The social media computing system 102 maintains various information related to user accounts in the account database 120. The account database 120 is where the social media computing system 102 stores information relating to usernames and passwords, user connections (e.g., which users are allowed to send messages to a given user), user contact information, user preference information, and the like. The account database 120 may include payment information associated with various user accounts. The payment information includes credit card information or bank account information, which is used by the social media computing system 102 to transfer funds between users 104 and from users 104 to merchants 108. In some arrangements, the account database 120 is split into multiple account databases. The offer database 122 is where the social media computing system 102 maintains current offers from the merchants 108. The offers include an identification of a product or service and pricing information about the product or service. The pricing information may be a price, a discount (e.g., an amount of dollars off, a percentage discount, etc.), a quantity limit, and the like. In some arrangements, the pricing information also includes offer expiration information. In some arrangements, the offers include target demographics that should receive the offer (e.g., age, sex, location, user preferences, income level, user purchase history, user web browsing history, etc.).

The user device 106 may be used by an individual user (e.g., a business owner or employee, a consumer, and so on) to create and interact with a social media platform. The user device 106 may, for example be, handheld computer, a cellular phone, smartphone, mobile handheld wireless e-mail device, a tablet computer, personal digital assistant, portable gaming devices, or another suitable device. The user device 106 includes a processor 124 and memory 126. The memory 126 includes programming modules and logic that, when executed by the processor 124, control the operation of the user device 106. In some arrangements, the memory 126 includes a social media client 134 (e.g., a smartphone application that includes the necessary programming and circuitry that allows the user device 106 to interact with the social networking platform). The user device 106 includes a network interface 128. The network interface 128 may be a wireless network interface that communicates with a wireless communication protocol (e.g., 802.11a/b/g/n, Bluetooth®, ZigBee®, CDMA, GSM, LTE, WiMax, etc.). The user device 106 includes a display 130 and an input 132. In some arrangements, the display 130 and input 132 are integrated in a touchscreen display. The user device 106 may receive and display user interfaces including account information, transaction instructions, and so on. In some arrangements, the user interfaces may be used to initiate messages (i.e., the receiving of offers, the acceptance of offers, etc.) payments from the user's social media account.

The social media client 132 includes program logic executable by the processor 124 to implement at least some or all of the functions described herein. As will be appreciated, the level of functionality that resides on the user device 106 as opposed to the social media computing system 102 may vary depending on the implementation. The social media client 132 may be a web browser that is configured to receive and display mobile web pages (e.g., web pages prompting the user to provide information to create an account, web pages displaying account balance information and past transactions, and so on) or an application executed by the user device 106. As will be appreciated, the user may also use other devices (e.g., laptop or desktop computer system, not shown) to access the social networking platform.

The social media client 132 may include, among other features, messaging logic 136 and account information 138. The messaging logic 136 allows users 104 of the user devices 106 to communicate with other users of the social networking platform. The other users may include users 104 and the merchant 108. The messaging function of the social media client 132 may also enable the users 104 to send payment to other users via messages. As described in further detail below, offers from the merchants 108 are communicated as messages. The account information 136 stores associations between the user 104 and other users of the social networking platform (e.g., friends or contacts).

Still referring to FIG. 1, the merchant 108 maintains a merchant computing system 116. The merchant computing system 116 includes a processor 140 and memory 142. The memory 142 stores programming modules and logic that, when executed by the processor 140, control the operation of the merchant computing system 116. The merchant computing system 116 also includes a network interface 144. The network interface 144 allows the merchant computing system 116 to communicate data to and from the user devices 106 and the social media computing system 102 via the network 118. The memory 142 includes offer logic that allows the merchant computing system 116 to send product or service offers to users 104 via the social media platform. The offers may be first transmitted for storage in the offer database 122 and for later distribution by the social media computing system 102. Some merchants include locator beacons 146. The locator beacons 146 broadcast unique identifiers that, when received by a user device 106, allow the user device 106 to transmit its location as wi2151 thin the merchant 108 (i.e., within a brick and mortar location of the merchant 108). A further description of the use of locator beacons 146 within merchants is described in U.S. patent application Ser. No. 14/745,245, entitled "BEACON MALL EXPERIENCE," filed on Jun. 19, 2015, which is hereby incorporated by reference in its entirety and for all purposes.

Figure 2:
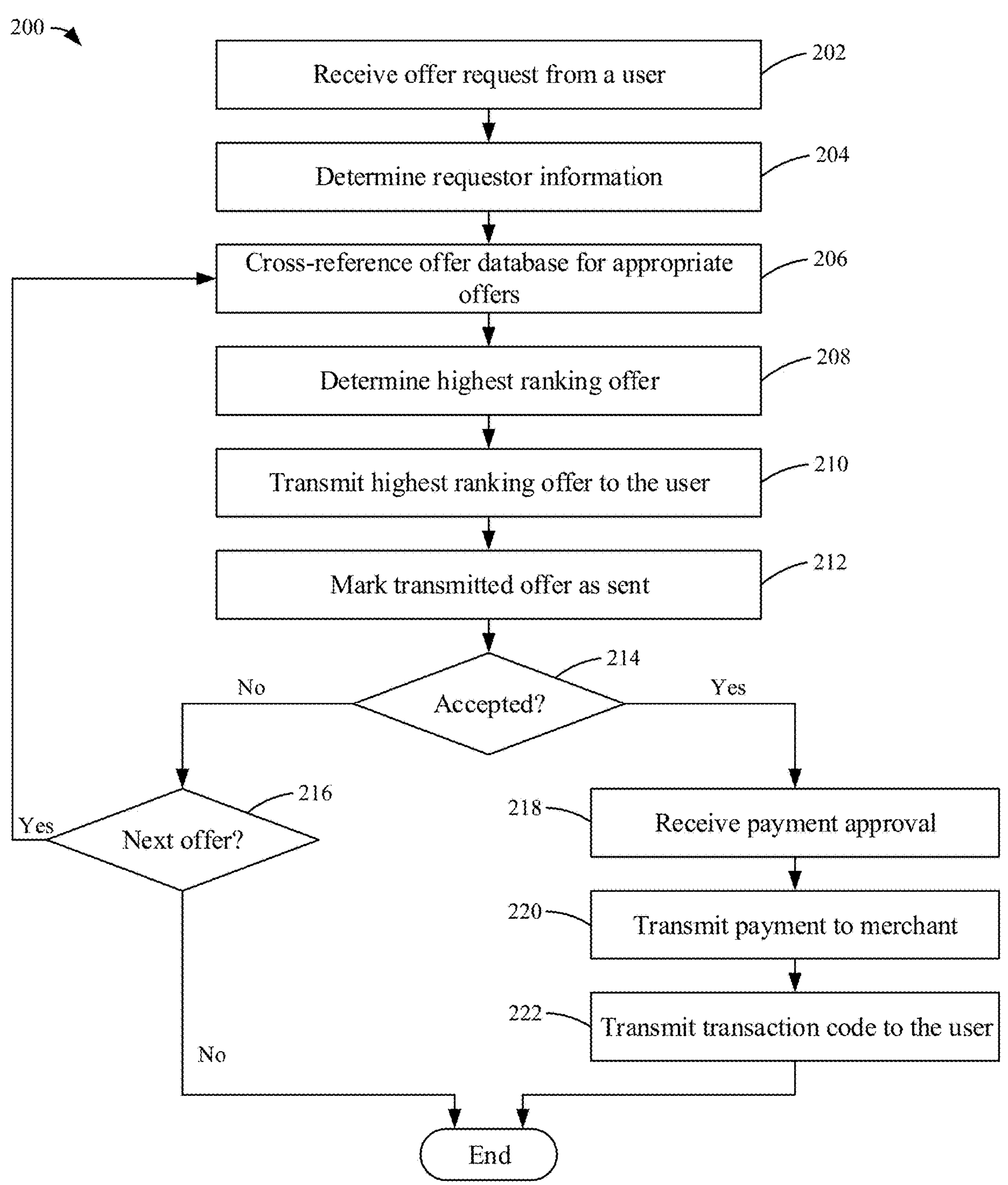
FIG. 2 is a flow diagram of a method of sending an offer to a user of the social networking platform based on a user request is shown according to an example embodiment

Referring to FIG. 2, a flow diagram of a method 200 of sending an offer to a user of the social networking platform based on a user request is shown according to an example embodiment. Method 200 is performed by the social media computing system 102 (e.g., by processor 110). Method 200 begins when an offer request is received from a user at 202. The offer request is received by the social media computing system 102 and from a user device 106 associated with the user. The request includes an identification of a product or service that the user would like to receive an offer on (i.e., the user would like to know if there are any special deals or merchant offers relating to the identified product or service). The product may be identified with a hashtag. For example, the user 104 may send a message saying "#shoes". The message may include multiple keywords, such as "#shoes #leather". In the example, the hashtag serves as a trigger for the social media computing system 102 to identify product offers related to the hashtagged word or keywords. The request also includes an identification of the user (e.g., a username associated with the user). In some arrangements, location information relating to the current location of the user device 106 being used by the user to send the request is received along with the request at 202. The location information may relate to GPS location information of the user device 106 or location information based on a determined position of the user device as identified through the locator beacons 146 if a merchant 108.

Figure 3:
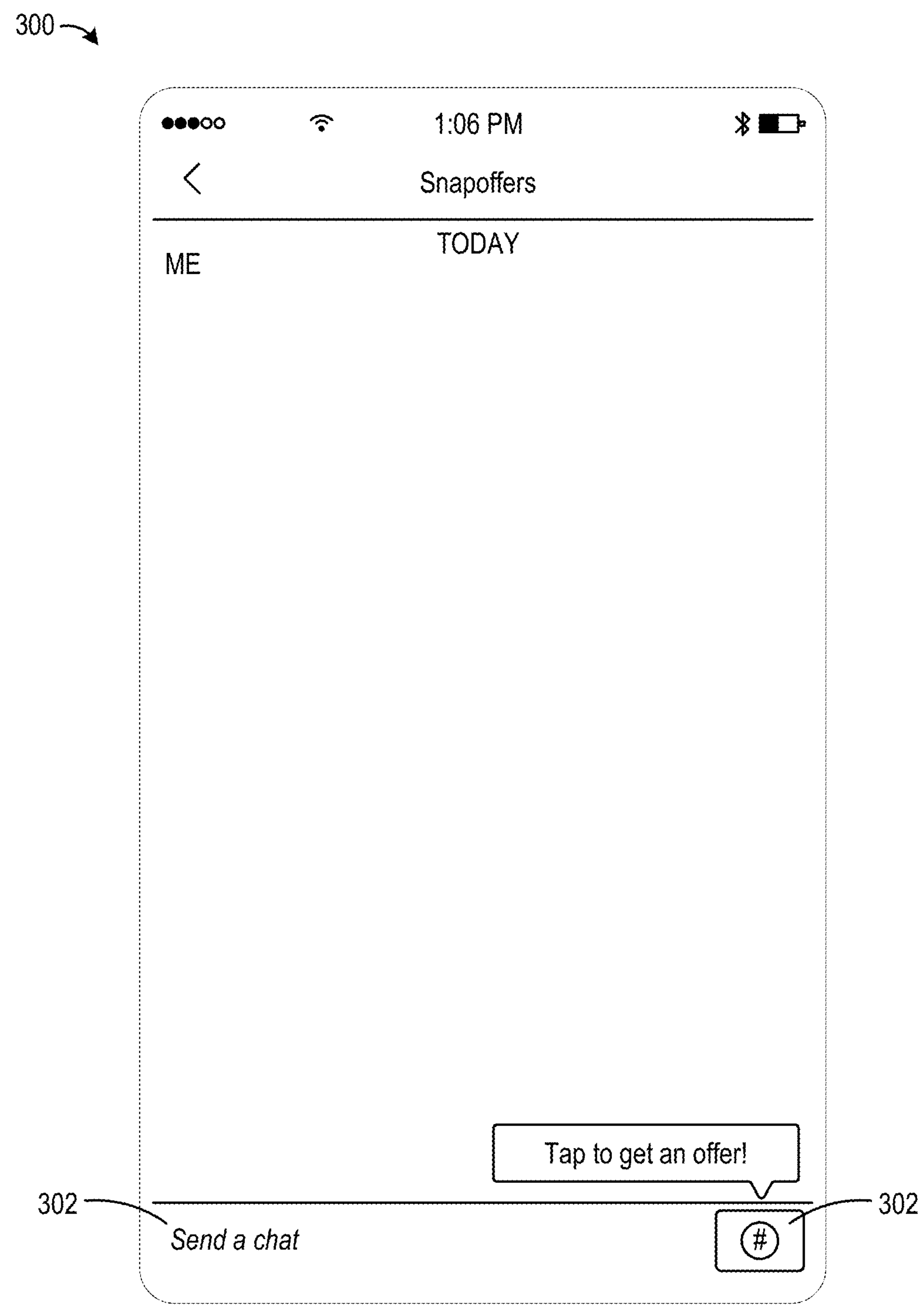
FIGS. 3 through 10 show example user interfaces of a social media client during the method of FIG. 2.
Figure 4:
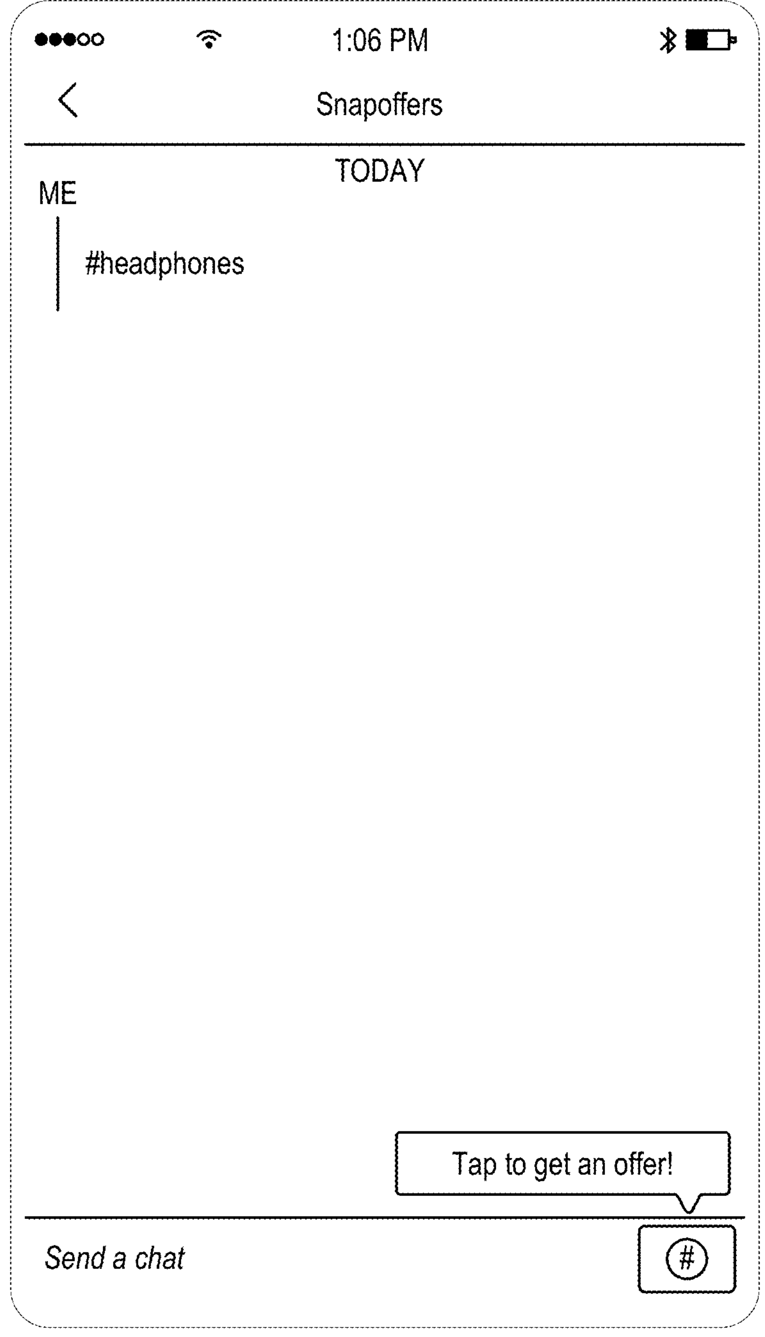

The request may be transmitted as a chat message to a contact that is an offer client of the social media computing system 102. For example, as shown in FIG. 3, an example user interface 300 of the offer feature as presented via the social media client 134 running on the user device 106. The user can type in a request into the "send a chat" bar 302 and click the send button 304 to send an offer request to "Snapoffers." In the arrangement shown in FIG. 3, the message receiving account "Snapoffers" is an account with the social media service that can receive messages from other users of the social media service. In some arrangements, the "Snapoffers" account is bot account that is automatically operated by the social media computing system 102 (e.g., all messages are received, analyzed, and automatically replied to by the social media computing system 102). As shown in FIG. 4, an example user interface 400 of the offer feature shows that the user requested an offer for headphones by sending "#headphones" as a message to Snapoffers.

Requestor information is determined at 204. The requestor information is determined by the social media computing system 102. In some arrangements, the requestor information is at least in part determined based on user information stored in the account database 120. The requestor information may include user demographic information (e.g., age, sex, shopping habits, browsing history, income level, etc.). The requestor information may include prior purchase data (e.g., shopping history, preferred stores, preferred price ranges, etc.) and offer acceptance/rejection information. In some arrangements, the requestor information includes identifying the location of the user initiating the request based on the received location information received at 202.

The offer database is cross referenced for appropriate offers at 206. The social media computing system 102 cross-references the offers database 122 with the identification of the product or the requested product type (i.e., the hashtagged keyword or keywords as received at 202) and the requestor information (as determined at 204) to identify appropriate offers to send in response to the initial request. The offers in the offer database are offers from the merchants 108. In some arrangements, the social media computing system 102 queries the offers database 122 for offers that match the information received with the offer request. In further arrangements, the social media computing system 102 limits offers to within a threshold distance of the requestor.

A highest ranking offer is determined at 208. The social media computing system 102 determines the best match, or highest ranking, offer based on the request and the requestor information. In some arrangements, more than one offer matches the request criteria. In such arrangements, the requestor information is used to identify the offer that most likely will satisfy the user's request. For example, if the user request was for a purse (e.g., the user sent a message to Snapoffers with the text "#purse"), and the user has a history of buying a first brand of purses and not a second brand of purses, offers relating to the first brand of purses may be ranked higher than offers relating to the second brand of purses. The multiple matches may also be prioritized at least in part based on a location of the merchant with respect to the location of the user. In some embodiments, the multiple matches may also be prioritized at least in part based on bids placed by the merchants. For example, for #purse, merchant A may place a bid of $. 10 and merchant B may place a bid of $0.12. The next time the text "#purse" is received, an offer may be selected based at least in part on which merchant placed the higher bid. For example, if Merchant A's offer is displayed, then Merchant A may pay the $. 10 bid amount to the social media platform for displaying the offer. The bid may be placed for simply displaying the offer to the user, or may further require that the user actually accept the offer in order for the bid amount to be paid. In embodiments where the bid payment is contingent upon the user accepting the offer, the offer may further be selected based on the probability of the user accepting the offer. For example, if Merchant A places a bid that is much higher than the bid from Merchant B, but Merchant A's bid is contingent upon the user accepting the bid, and Merchant A's offers have performed poorly in the past, then Merchant B may be more likely to be selected.

Figure 5:
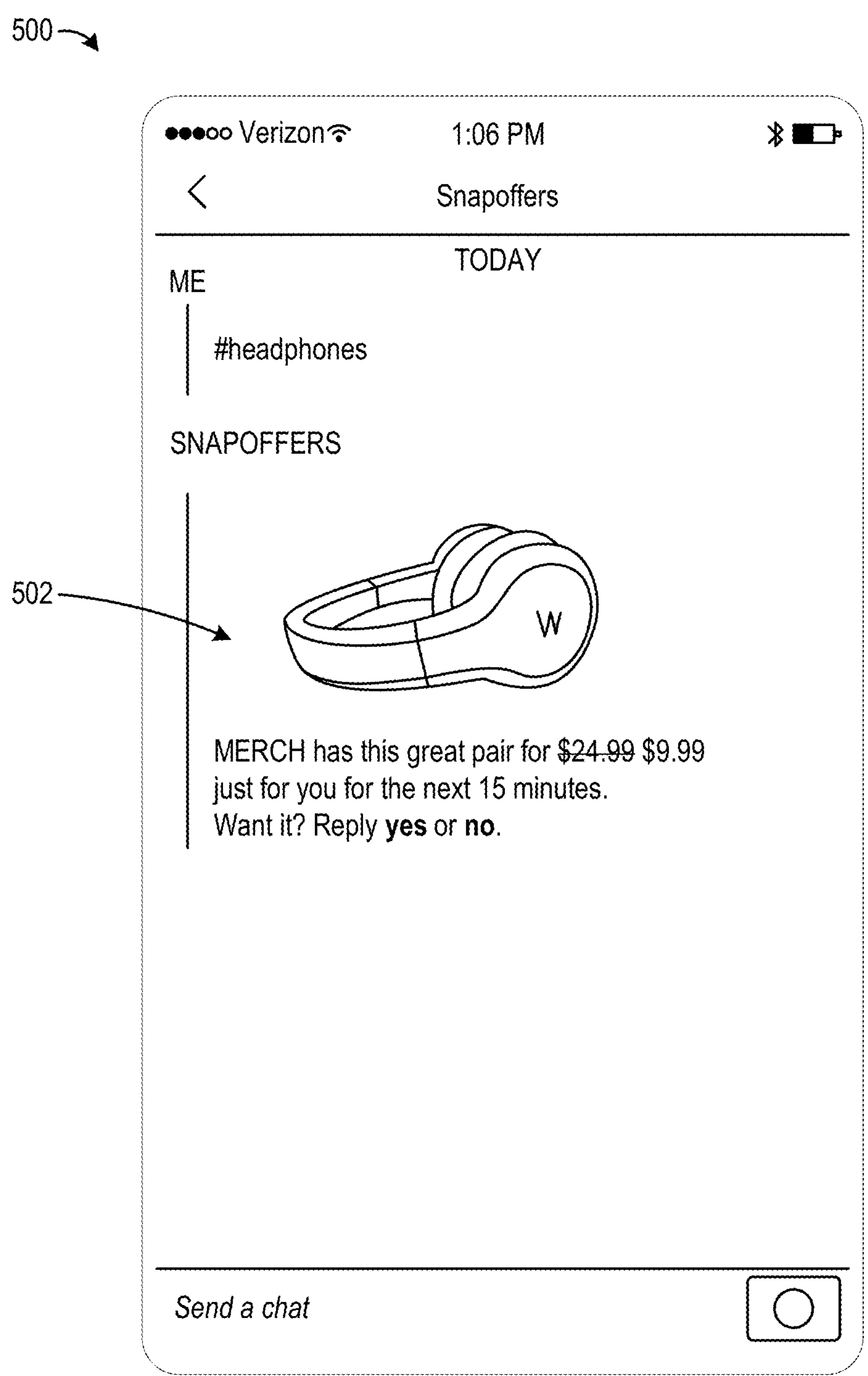

The highest ranking offer is transmitted to the user at 210. The social media computing system 102 generates and transmits the offer to the user device 106. The offer includes an identification of a product or service and a price of the product or service. In some arrangements, the offer identifies the merchant 108 offering the product or service. In further arrangements, the offer includes a hyperlink to a product page containing more information about the offered product or service (e.g., at a website of the merchant 108). The offer includes a request for the user to accept or reject the offer. In some arrangements, the offer expires after a designated period of time (e.g., 5 minutes, 10 minutes, 15 minutes, etc.). For example, FIG. 5 shows an example user interface 500 in which an offer 502 is sent to a user via the social media client 134. The offer 502 of FIG. 5 is for a pair of headphones in response to the users initial offer request. The offer 502 includes an identification of the merchant ("MERCH"), an identification of the price ("$9.99), an indication of the offer's expiration ("15 minutes"), and an invitation for the user to accept or reject the offer by replying to the message containing the offer. Referring again to FIG. 2, after transmitting the offer at 210, the transmitted offer is marked as sent at 212. The social media computing system 102 marks the offer as sent to the user in the offer database 122. Marking the offer as sent ensures that the social media computing system 102 will not send that specific offer to the user again within a set time period.

Figure 6:

At 214, the social media computing system 102 determines whether the offer was accepted or not. The offer is accepted if the user responds with an acceptance via the user device 106 (e.g., by sending a "yes" message as shown in user interface 600 of FIG. 6). In such situations, the social media computing system 102 receives the acceptance from the user device 106. The offer is rejected if the user responds with a rejection via the user device 106 (e.g., by sending a "no" message) or by allowing the offer to expire. If the offer expires, the computing system 102 determines whether to send the next highest priority offer at 216. In some arrangements, the next highest priority message is sent if there are more than one possible offers matching the user's initial offer request and if the user indicated that multiple offers are to be delivered (e.g., by the user sending the request again, based on user preferences, etc.) after the previously sent offer message is rejected or expired. If the next offer is to be sent, method 200 returns to 206. If a next offer is not to be sent or no next offer exists, method 200 ends.

Figure 7:
Figure 8:
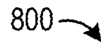
Figure 8:
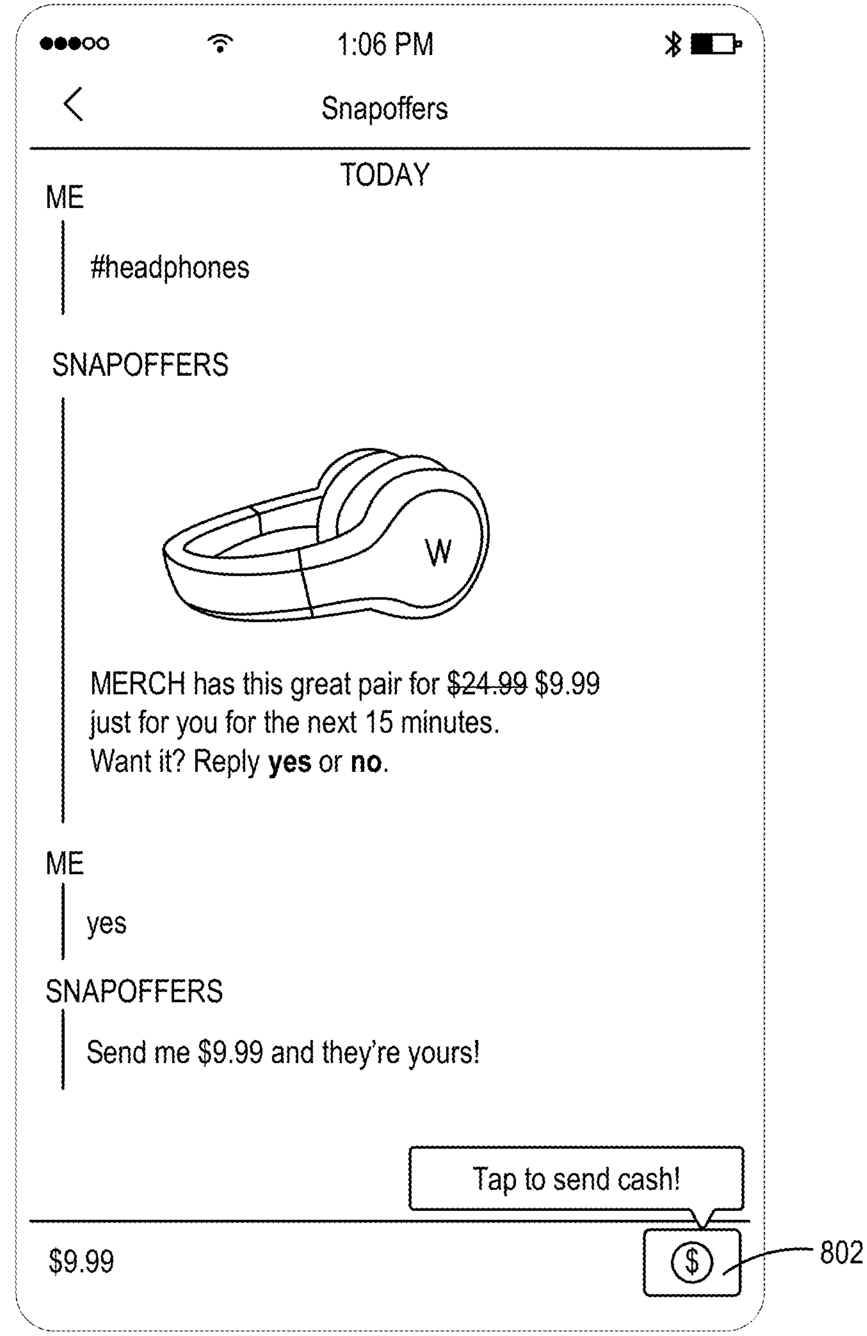
Figure 9:
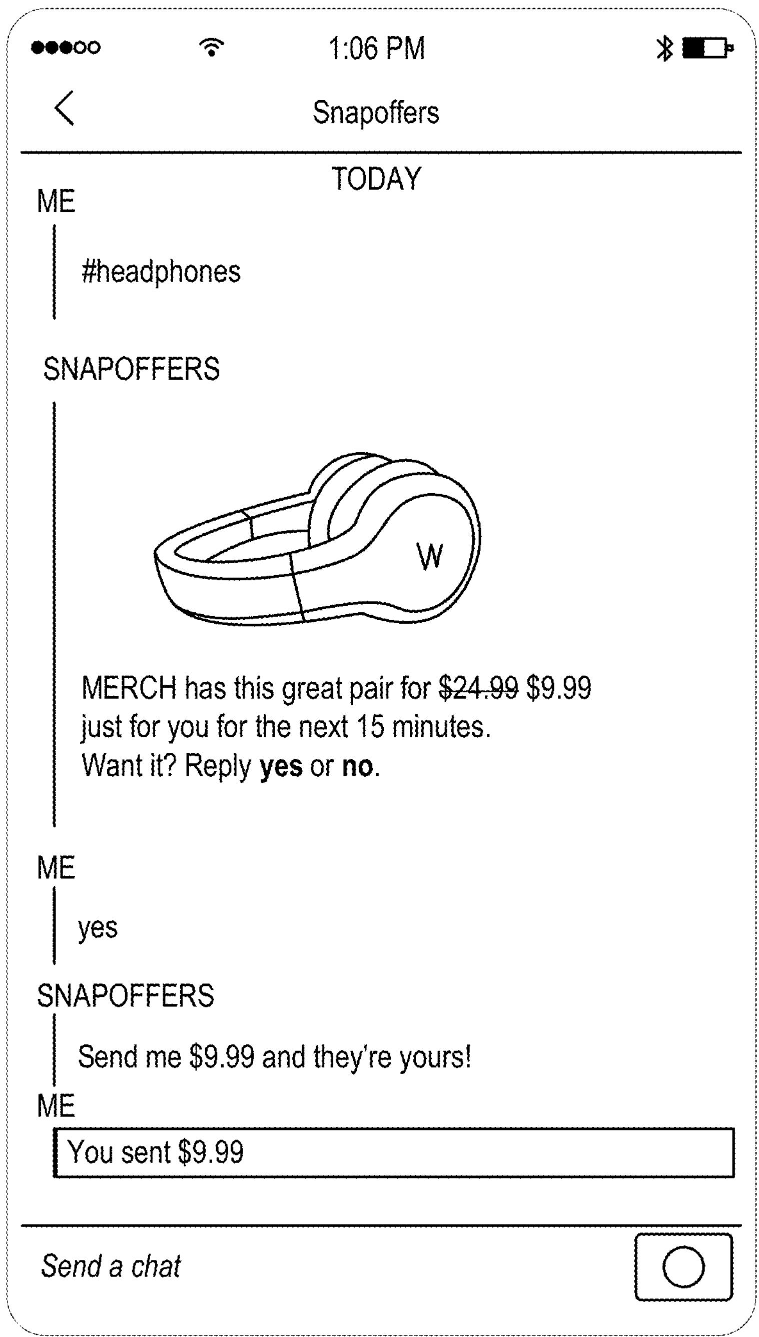

If the offer was accepted at 214, payment approval must be received prior to moving forward with the offer. The social media computing system 102 receives payment approval from the user via the user device 106. For example, as shown in FIGS. 7 through 9, various user interfaces 700, 800, and 900 are shown that show the back and forth between the social media computing system 102 and the user 104 to provide payment approval. As shown in user interface 700, the social media computing system 102 first sends a request to provide funds. The user can provide funds by entering a payment amount (e.g., $9.99) and clicking a send funds button 802 on user interface 800. The social media computing system 102 may respond to the sent funds with an indication that the funds were received, as shown in user interface 900. The source of the funding may be a bank account or credit card account already associated with the user's social media platform account, which may be stored in the account database 120. In other arrangements, the user can provide a new payment source (e.g., a bank account, a credit card account, a gift card number, etc.) via a follow-up message from the user device 106 to the social media computing system 102.

Payment is transmitted to merchant at 220. The social media computing system 102 transmits payment to the merchant 108 to indicate that the user 104 purchased the item or service in the offer. Payment may be effectuated through a third party (e.g., a credit card processor, a financial institution, etc.).

Figure 10:

A transaction code is transmitted to the user at 222. The social media computing system 102 generates and transmits the transaction code to the user device 106. In some arrangements, the transaction code is generated by the merchant computing system 116 and is sent to the social media computing system 102 where the transaction code is forwarded to the user device 106. In other arrangements, the transaction code is generated by the social media computing system 102 and is sent to both the user device 106 and the merchant computing system 116. An exemplary transaction code is shown in user interface 1000 of FIG. 10. The transaction code allows the user to claim the purchased product or services. The transaction code may be redeemed at a brick-and-mortar location of the merchant 108 or via the merchant's website. In arrangements where the transaction code is redeemed online, the user may enter the transaction code into a coupon code or discount code field of the checkout screen on the merchant's website. In such arrangements, the transmittal of the transaction code may include a hyperlink to the merchant's website. In other arrangements, the transaction code may be in the form of a barcode or a two-dimensional barcode (e.g., a QR code) that can be presented by the user (e.g., via the display 130 of the user device 106, by printing the transaction code, etc.) such that the transaction code can be scanned at a point of sale system of the merchant 108.

In some arrangements, the social media computing system 102 can allow users 104 to maintain a list of accepted offers. The list may be called a shopping list. The social media computing system 102 can also create a shopping route and navigation instructions. For example, if a user has accepted a first offer for shoes at a first merchant, a second offer for pants at a second merchant, and a third offer for a coat at a third merchant, the social media computing system 102 can determine the optimal shopping route for the user to pick up the accepted offers in the least amount of time. The optimal route may be determined based on the user's location, the locations of the merchants, and traffic data. The optimal route is transmitted to the user device 106 associated with the user, where it can be followed via a navigation or maps program executed on or a navigation or maps website accessed by the user device 106.

Figure 11:
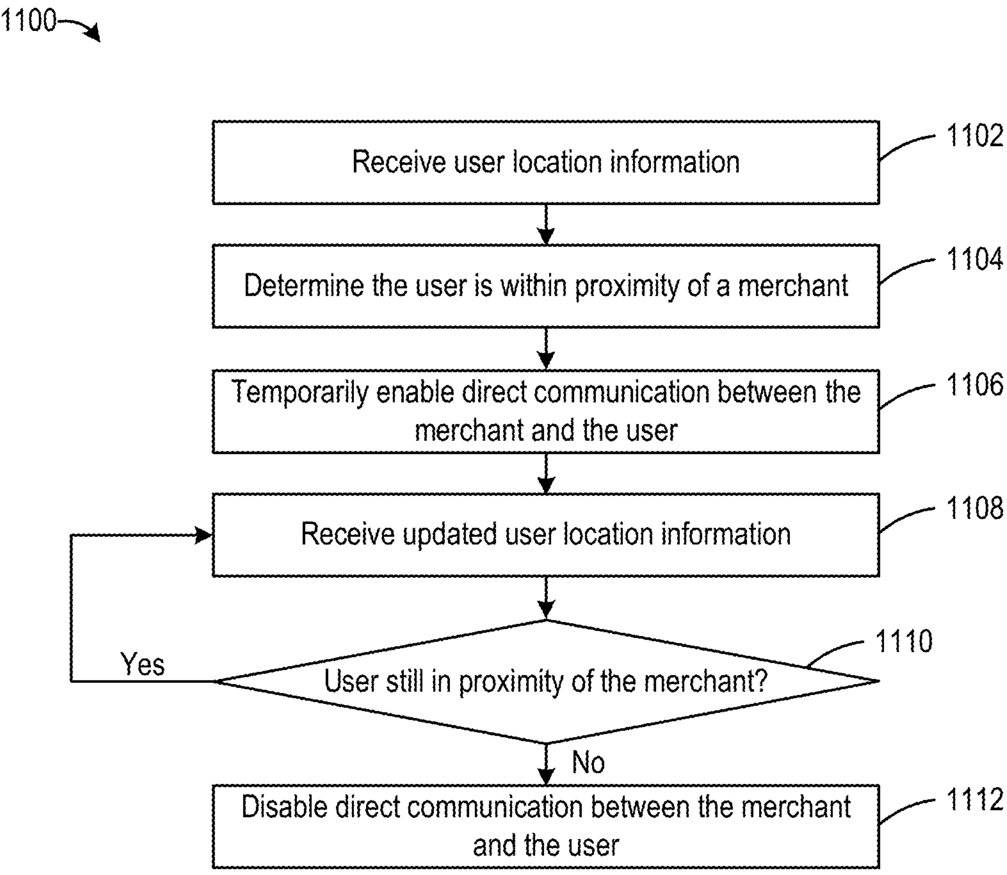
FIG. 11 is a flow diagram of a method of permitting a merchant to send an offer to a user of a social media platform based on a location of the user according to an example embodiment.
Figure 14:
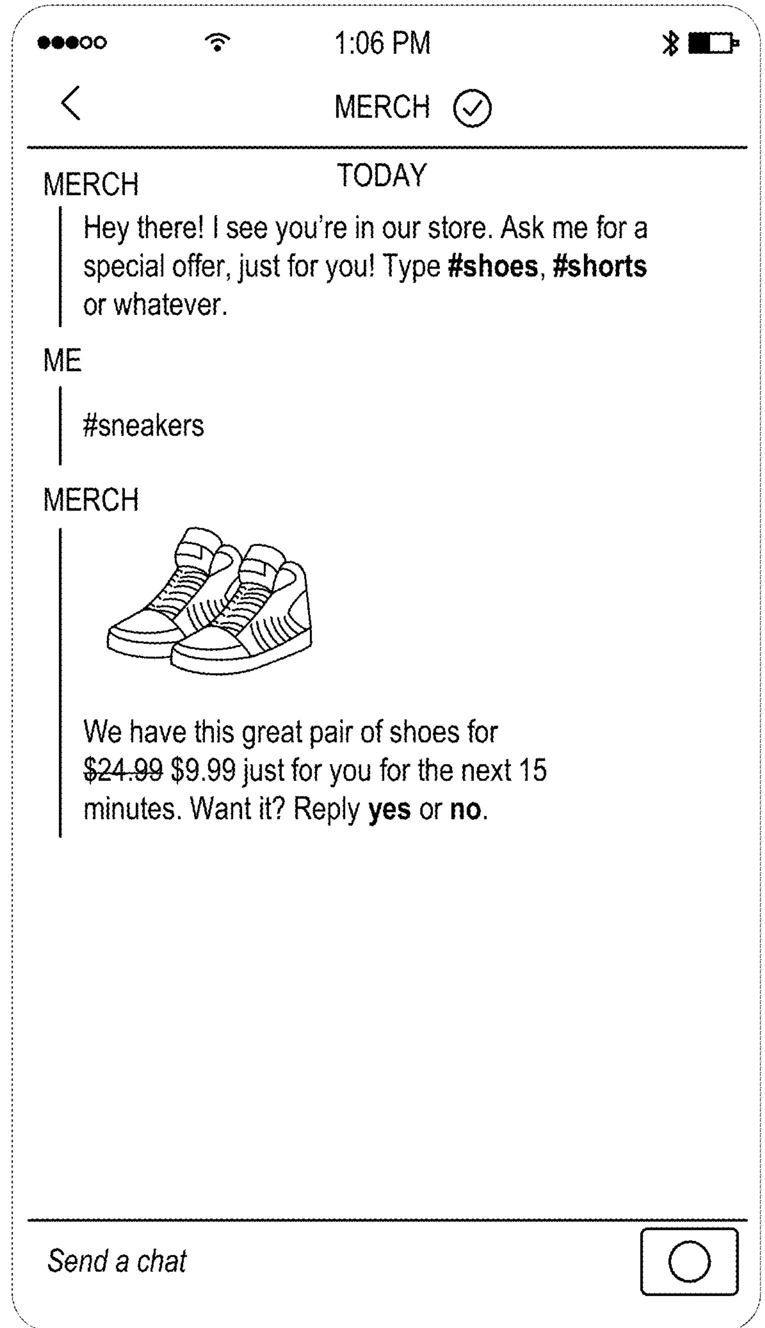
Figure 15:
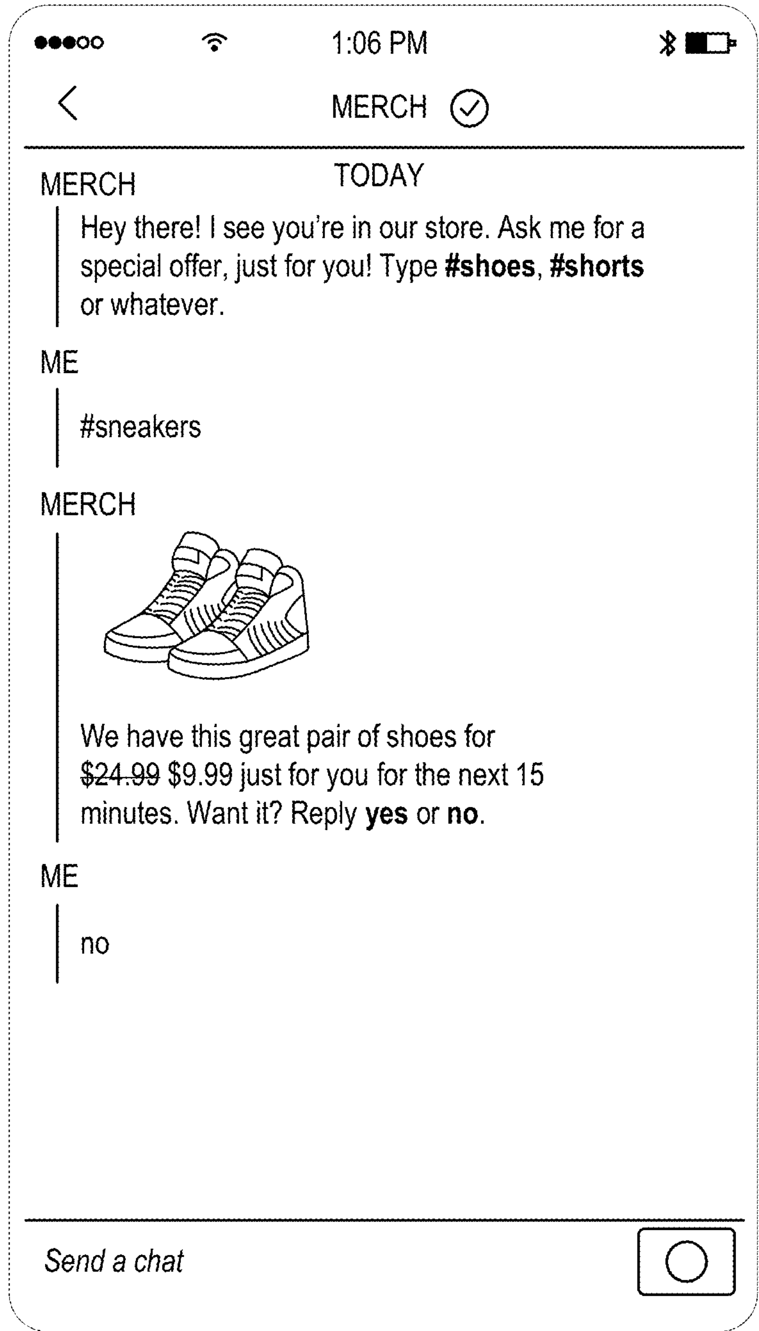
Figure 16:
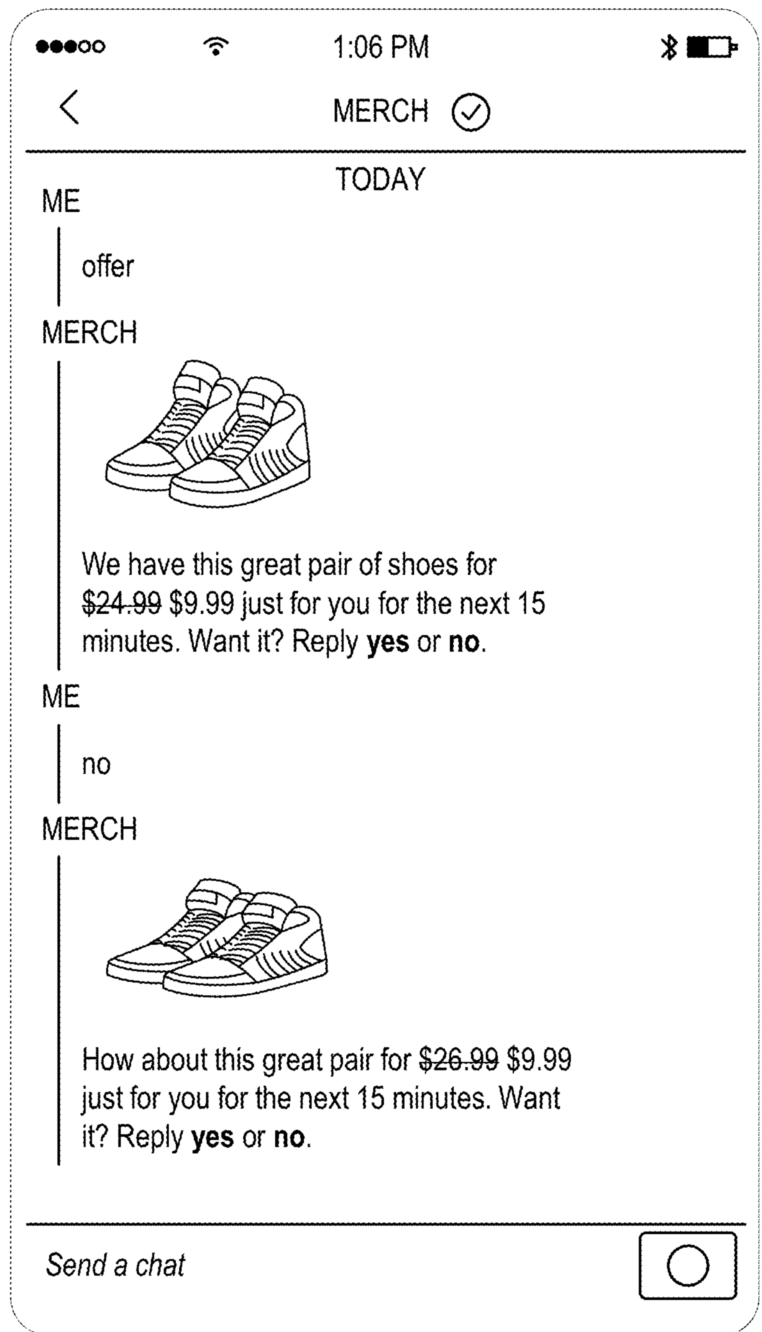
Figure 17:
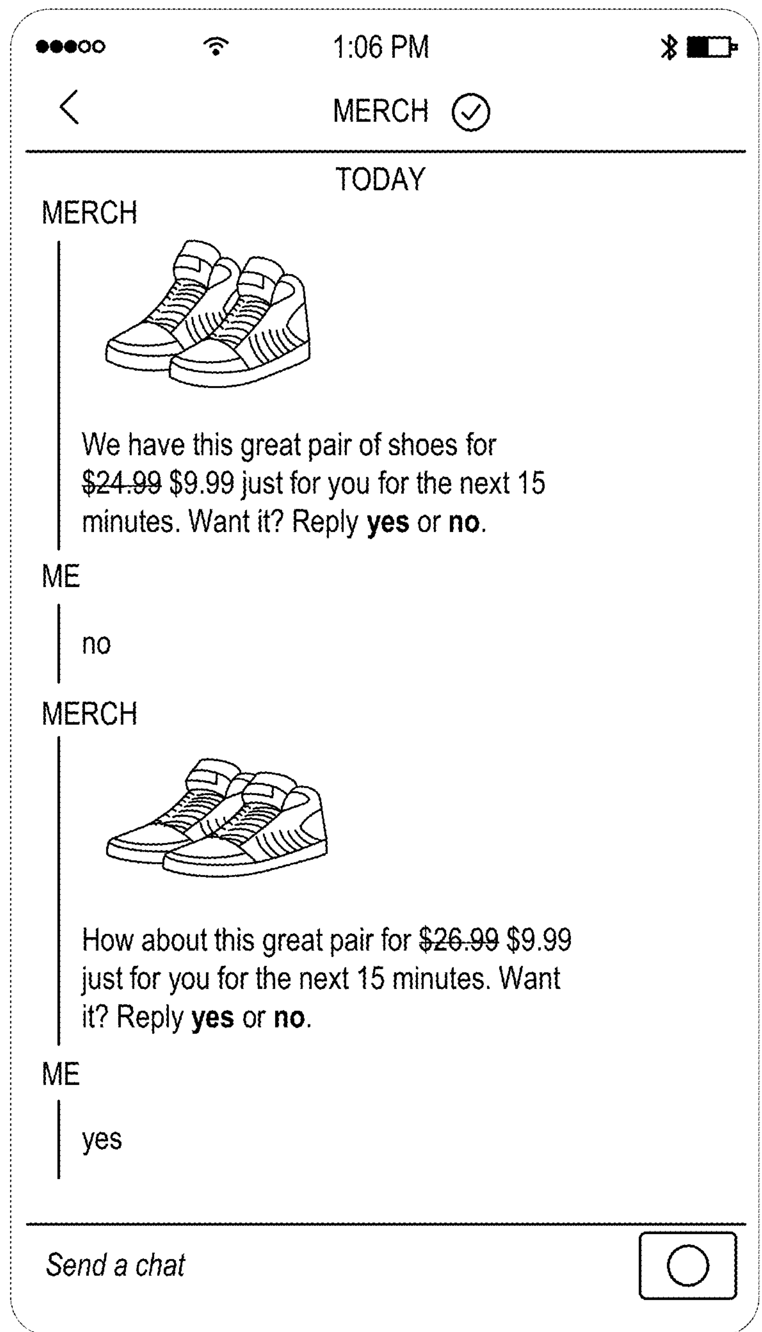
Figure 18:
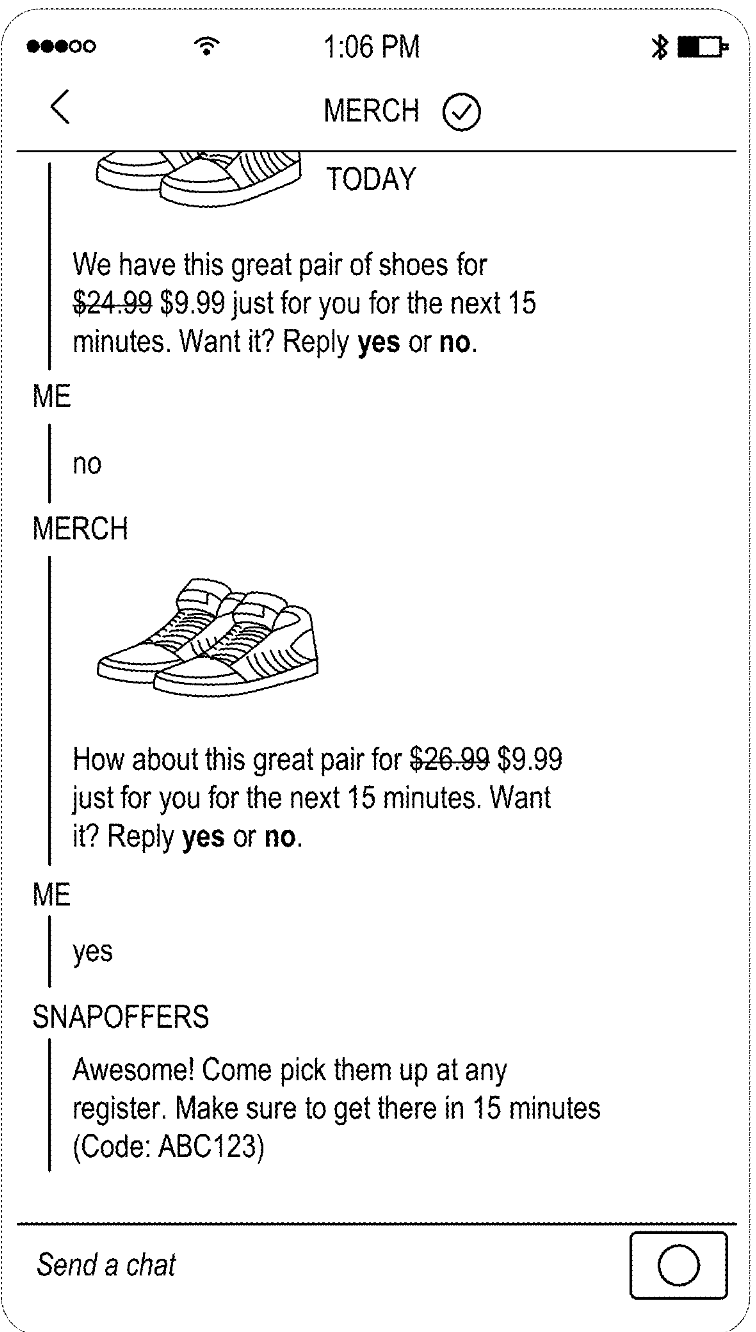

Referring to FIG. 11, a flow diagram of a method 1100 of permitting a merchant to send an offer to a user of a social media platform based on a location of the user according to an example embodiment. Method 1100 is performed by the social media computing system 102 (e.g., by processor 110). Method 1100 is similar to method 200, however, method 1100 permits the merchant 108 to directly reach out to the user with product or service offers via the social media computing system 102. Method 1100 begins when user location information is received at 1102. The social media computing system 102 receives the location information from the user device. The user location information may relate to at least one beacon identifiers (e.g., from beacons 146), GPS coordinates, cell tower location information, wireless network SSID information, or the like.

The user is determined to be within a proximity of a merchant at 1104. The social media computing system 102 determines that the user is within proximity of the merchant 108. The proximity may be predetermined to be within a set distance from a location of the merchant 108 or within the location of the merchant 108. In some arrangements, the location information may indicate that the user is in a certain area within a location of the merchant 108 (e.g., within the men's department of a department store).

Direct communication between the merchant and the user via the social networking platform is temporarily enabled at 1106. The social media computing system 102 enables the merchant 108 to send messages with offers to the user 106. As described above, the social media platform may place restrictions on the messages that can be sent to the user 106. For example, the user 106 may only receive messages from those other users that the user 106 has approved to be a contact. Accordingly, by enabling direct communication between the merchant 108 and the user 106, the social media computing system 102 allows the merchant 108 to send messages to the user 106 via the social media platform. The messages are routed through the social media computing system 102. The messages from the merchant 108 may include offers for products or services provided by the merchant 108 (in a similar manner as described above with respect to method 200). The primary difference between method 200 and method 1100, however, is that the offers are selected directly by the merchant 108 and are transmitted by the merchant computing system 116 via the social media computing system 102, which facilitates the messaging of the social media platform.

For example, a set of user interfaces (1200, 1300, 1400, 1500, 1600, 1700, and 1800) are shown in FIGS. 12 through 18, which demonstrate a back and forth message session that occurs while the merchant 108 is temporarily permitted to send offers to the user 104. User interface 1200 shows an initial message from the merchant 108 to the user 104. The message of interface 1200 lets the user 104 know that the user 104 can request offers directly from the merchant 108. The user 104 responds in user interface 1300 with a message indicating that the user 104 is interested in shoes. Based on the request for offers for shoes, the merchant computing system 116 searches the offers of the merchant 108 for offers matching shoes and transmits a first offer. As shown in user interface 1500, the user 104 rejects the first offer. In response to the rejection, the merchant computing system 116 transmits a second offer to the user 104 for a second pair of shoes. The user accepts the second offer in user interface 1700. The merchant computing system 116 transmits an offer code (e.g., ABC123) to the user 104 in user interface 1800. The offer code is later used by the user 104 to redeem the offer (e.g., in a similar manner as described above with respect to the method 200).

Updated user location information is received at 1108. The updated user location information is received by the social media computing system 102 form the user device 106. The updated user location information may be received on a regular bases (e.g., every set period of time, continuously, etc.). The updated user location information may relate to updated beacon identifiers, updated GPS coordinates, updated cell tower location information, updated wireless network SSID information, or the like. Based on the updated user location information, the social media computing system 102 determines whether the user is still within the designated proximity of the merchant at 1110. If the user is still within the designated proximity, method 1100 returns to step 1108. If the user is not with in the designated proximity, direct communication between the merchant and the user is disabled at 1112. In some arrangements, a message is sent from the social media computing system 102 to the merchant computing system 116 indicating that the user is no longer in or near the merchant's location.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A computing system comprising:
- a network interface configured to communicate with a user device associated with a user and a merchant computing system associated with a merchant; and
- one or more processors configured to:
  - receive user location information of the user device, wherein the user location information identifies a first position of the user device;
  - determine that the first position of the user device is in proximity to the merchant;
  - establish, based on the user device being in proximity to the merchant, chat communications between the user device and the merchant computing system, wherein establishing the chat communications causes the merchant computing system to send a first chat message containing an offer from the merchant computing system to the user device, the offer relating to a product or service of the merchant;
  - receive updated user location information of the user device, wherein the updated user location information identifies a second position of the user device;
  - determine whether the second position of the user device is in proximity to the merchant;
  - responsive to determining, based on the second position of the user device, that the user device is not in proximity to the merchant, disable the chat communications between the user device and the merchant computing system to prevent the merchant computing system from sending a second chat message to the user device via the computing system; and
  - responsive to determining, based on the second position of the user device, that the user device remains in proximity to the merchant:
    - receive, from the user device, an acceptance of the offer contained in the first chat message transmitted by the merchant computing system via the computing system; and
    - transmit, to the user device, a transaction code that allows the user to claim the product or service from the merchant associated with the offer.

2. The computing system of claim 1, wherein the one or more processors are further configured to generate a request for offers from the merchant computing system responsive to determining that the user device is in proximity to the merchant based on the first position of the user device as identified by the user location information.

3. The computing system of claim 2, wherein the one or more processors are further configured to receive the offer from the merchant computing system.

4. The computing system of claim 1, wherein the transaction code includes a hyperlink selectable by the user to redeem the offer on a merchant website associated with the merchant.

5. The computing system of claim 1, wherein the transaction code includes a QR code that can be presented on the user device to be scanned at a point of sale system of the merchant.

6. The computing system of claim 1, wherein the one or more processors are further configured to determine a highest ranking offer from a list of one or more offers based on a location of one or more merchants providing the list of one or more offers and transmit the highest ranking offer to the user device.

7. The computing system of claim 6, wherein the highest ranking offer includes a hyperlink to a product page displaying information about a respective product associated with the highest ranking offer, wherein the hyperlink is selectable by the user on the user device.

8. The computing system of claim 1, wherein the one or more processors are further configured to receive a payment approval with the acceptance of the offer from the user device prior to transmitting payment to the merchant.

9. The computing system of claim 1, wherein the user location information comprises GPS coordinates, cell tower location information, or a wireless network SSID.

10. The computing system of claim 1, wherein the one or more processors are further configured to:
- receive a plurality of offers from the merchant computing system, each of the plurality of offers associated with a bid size; and
- select the offer from the plurality of offers based on the bid size.

11. The computing system of claim 1, wherein the one or more processors are further configured to:

maintain a list of accepted offers for the user device;

generate, based on (i) the updated user location information of the user device and (ii) a location of each merchant associated with each respective offer of the list of accepted offers, navigational instructions for the user of the user device to claim the product or service from the merchant; and transmit the navigational instructions to the user device.

12. A computer-implemented method comprising:

receiving, via a network interface configured to communicate with a user device associated with a user and a merchant computing system associated with a merchant, user location information of the user device, wherein the user location information identifies a first position of the user device;

determining that the first position of the user device is in proximity to the merchant;

establishing, based on the user device being in proximity to the merchant, chat communications between the user device and the merchant computing system, wherein establishing the chat communications causes the merchant computing system to send a first chat message containing an offer from the merchant computing system to the user device, the offer relating to a product or service of the merchant;

receiving updated user location information of the user device, wherein the updated user location information identifies a second position of the user device;

determining whether the second position of the user device is in proximity to the merchant;

responsive to determining, based on the second position of the user device, that the user device is not in proximity to the merchant, disabling the chat communications between the user device and the merchant computing system to prevent the merchant computing system from sending a second chat message to the user device; and responsive to determining, based on the second position of the user device, that the user device remains in proximity to the merchant:

receiving from the user device, an acceptance of the offer contained in the first chat message transmitted by the merchant computing system; and transmitting, to the user device, a transaction code that allows the user to claim the product or service from the merchant associated with the offer.

13. The method of claim 12, further comprising:

generating a request for offers from the merchant computing system responsive to determining that the user device is in proximity to the merchant based on the first position of the user device as identified by the user location information; and receiving the offer from the merchant computing system.

14. The method of claim 12, wherein the updated user location information is received from the user device.

15. The method of claim 12, wherein the transaction code includes at least one of a hyperlink selectable by the user to redeem the offer on a merchant website associated with the merchant, or a QR code that can be presented on the user device to be scanned at a point of sale system of the merchant.

16. The method of claim 12, further comprising determining a highest ranking offer from a list of one or more offers based on a location of one or more merchants providing the list of one or more offers and transmitting the highest ranking offer to the user device, wherein the highest ranking offer includes a hyperlink to a product page displaying information about a respective product associated with the highest ranking offer, wherein the hyperlink is selectable by the user on the user device.

17. The method of claim 12, further comprising receiving a payment approval with the acceptance of the offer from the user device prior to transmitting payment to the merchant.

18. The method of claim 12, further comprising receiving GPS coordinates, cell tower location information, or a wireless network SSID associated with the user location information.

19. The method of claim 12, further comprising:

receiving a plurality of offers from the merchant computing system, each of the plurality of offers associated with a bid size; and selecting the offer from the plurality of offers based on the bid size.

20. The method of claim 12, wherein the method is implemented by a first computing system, and wherein the first chat message and the second chat message are sent to the user device via the first computing system.

* * * * *